US006959730B2

(12) United States Patent
Margiott

(10) Patent No.: US 6,959,730 B2
(45) Date of Patent: Nov. 1, 2005

(54) SINGLE VALVE FUEL CELL STACK GAS FLOW AND CONTAINMENT

(75) Inventor: Paul R. Margiott, South Windsor, CT (US)

(73) Assignee: UTC Fuel Cells, LLC, South Windsor, CT (US)

(*) Notice: Subject to any disclaimer, the term of this patent is extended or adjusted under 35 U.S.C. 154(b) by 187 days.

(21) Appl. No.: 10/685,758

(22) Filed: Oct. 15, 2003

(65) Prior Publication Data
US 2005/0081930 A1   Apr. 21, 2005

(51) Int. Cl.$^7$ .............................................. H01M 8/04
(52) U.S. Cl. ...................... 137/625.43; 429/17; 429/39
(58) Field of Search .......................... 137/625.43, 311; 429/14, 17, 39

(56) References Cited

U.S. PATENT DOCUMENTS

| | | | | |
|---|---|---|---|---|
| 4,200,682 A | * | 4/1980 | Sederquist | 429/17 |
| 4,702,269 A | * | 10/1987 | Schuler | 137/625.43 |
| 6,148,613 A | * | 11/2000 | Klopp et al. | 60/296 |
| 6,242,125 B1 | * | 6/2001 | Eidler et al. | 429/17 |
| 6,455,185 B2 | * | 9/2002 | Bircann et al. | 429/34 |
| 6,830,844 B2 | * | 12/2004 | Keegan | 429/17 |
| 6,911,277 B2 | * | 6/2005 | Skala et al. | 429/39 |

* cited by examiner

Primary Examiner—John Fox
(74) Attorney, Agent, or Firm—M. P. Williams

(57) ABSTRACT

A vane (31) at the juncture of orthogonal conduits (25–28) allows flow of air to and from the air inlet/outlet manifold (12) of a fuel cell stack (11) when it is disposed in a first position, and totally blocks the conduits (25, 26) so as to isolate the air flow fields of the fuel cells (17, 18) when in a position normal to the first position. A vane (41) can comprise the divider of the air inlet/outlet manifold when in a vertical position, and totally block off the manifold when in a horizontal position. A vane (59) can align with the divider (24) of an air inlet/out manifold when in a vertical position, and block the passage between the manifold and conduits (44, 46) when in a horizontal position. Similar vanes may be used for single-valve selection of flow or containment of fuel reactant gas.

6 Claims, 3 Drawing Sheets

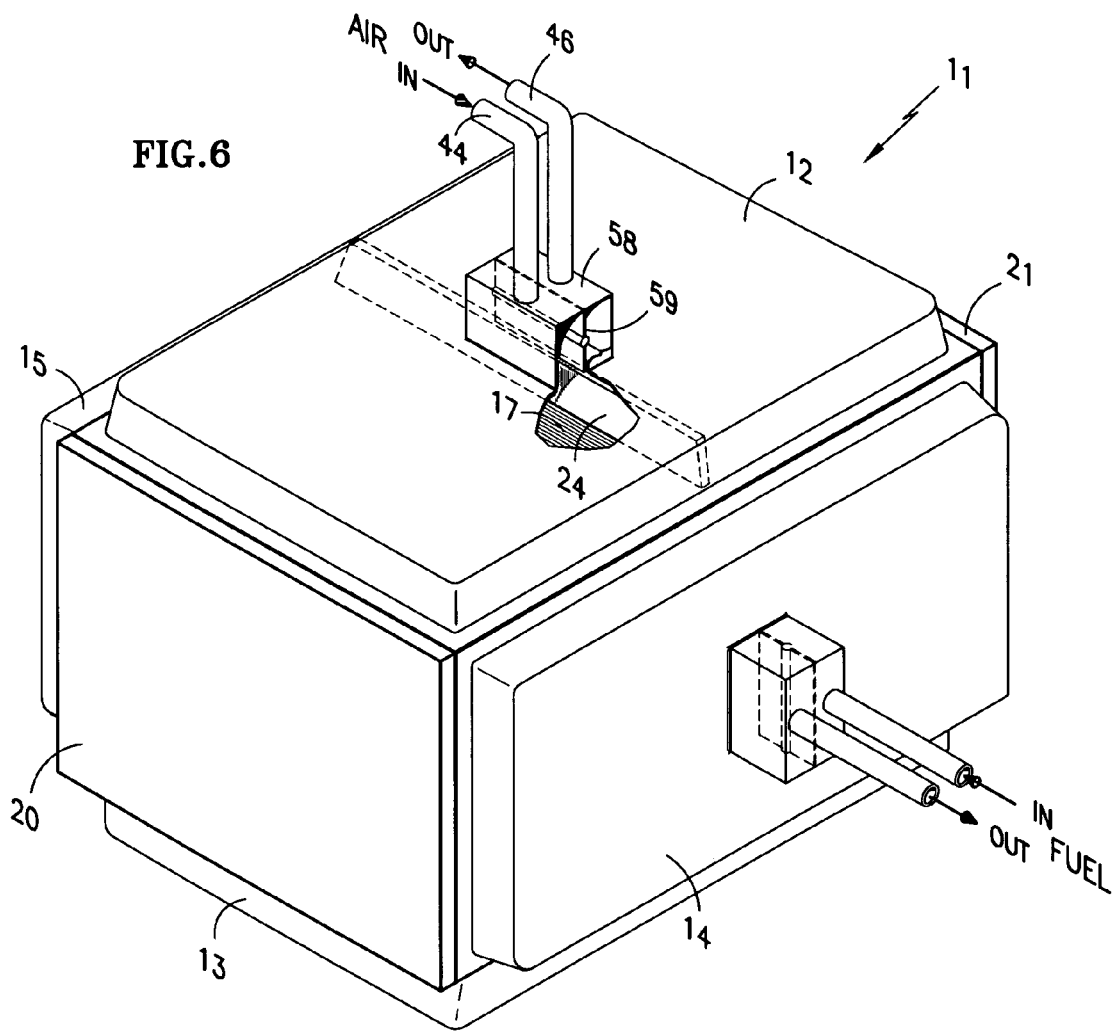
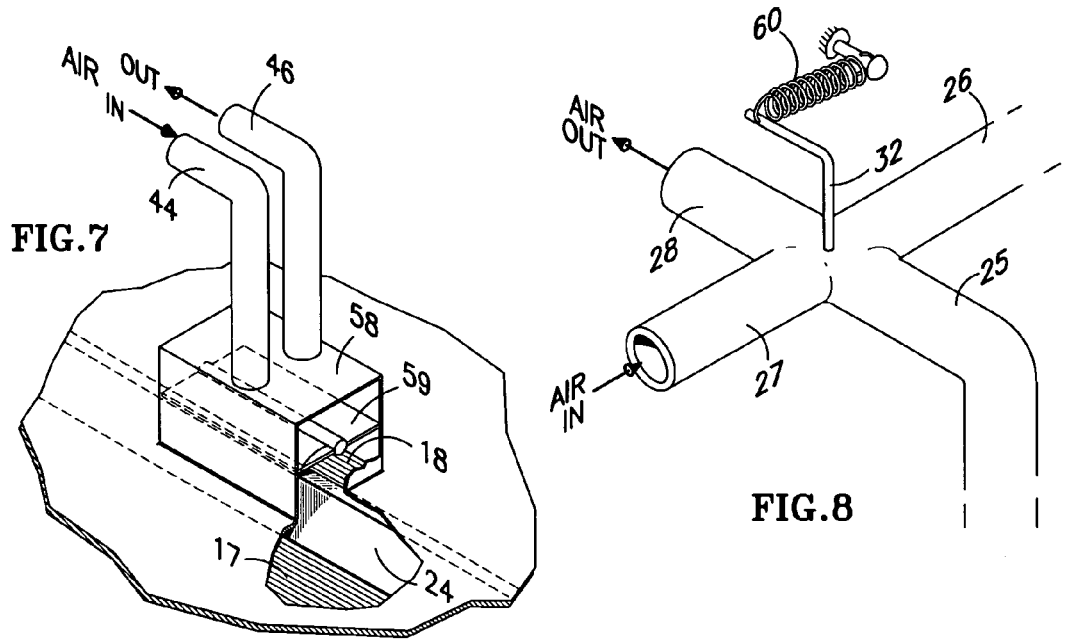

US 6,959,730 B2

SINGLE VALVE FUEL CELL STACK GAS FLOW AND CONTAINMENT

TECHNICAL FIELD

This invention relates to a single valve on the inlet and outlet of either or both of the reactant gas flow paths of a fuel cell stack.

BACKGROUND ART

It is known in the prior art that when a fuel cell power plant is shut down, with no electrical load across the cell, the reactant gases remaining in the fuel cell typically cause high cell voltages which in turn cause oxidation and corrosion of catalysts and catalyst supports. This in turn causes degradation of cell performance.

One manner to mitigate this problem is to purge the cell with inert gases, or nearly completely inert gases. In U.S. patent application Ser. No. 09/872,957, filed Jun. 1, 2001, a shut down procedure is postulated which requires containment of a particular gas mixture of hydrogen and principally nitrogen with possibly other gases that are inert and not harmful to the fuel cell. The nitrogen may be obtained from air, the oxygen of which is consumed early in the process by reacting with the hydrogen within the cell.

To maintain any particular gas composition in the fuel cell during a shut down period, it is necessary to close off the fuel and/or oxidant reactant flow field inlets and outlets.

In some atmospheric fuel cell power plants, no valves are utilized on the air flow. In other systems, only a single valve is used in the air flow. In order to maintain a particular gas composition within the oxidant flow fields, it is therefore necessary to add one or two valves to a fuel cell power plant.

In the case of the fuel reactant gas flow fields, two valves may typically be provided so that there is no problem in isolating the fuel gas flow fields during shut down, provided the expense and complexity of two valves are acceptable.

DISCLOSURE OF INVENTION

Objects of the invention include provision of single valve control over flow of fuel or oxidant reactant gases into and out of a fuel cell stack, as well as containment of gases within one or both flow fields of the fuel cell stack during shutdown.

According to the present invention, a single valve is positionable in either of two positions, one position providing flow of reactant gas into a reactant gas flow field and the flow of reactant gas out of the reactant flow field, and a second position preventing flow into or out of the same reactant gas flow field.

According to the invention in one form, conduits are formed into a cross with flow connections such that a vane in a first position permits flow between adjacent conduits which comprise the inlet conduit on the one hand the outlet conduit on another hand; and, when in a second position, permits flow between adjacent conduits, one pair of which are the external reactant gas inlet and external reactant gas outlet, the other pair of which interconnect the inlet of the flow field with the outlet of the flow field, and thus the flow fields are blocked.

In another embodiment, a damper valve which straddles the division between the reactant gas inlet portion and the reactant gas outlet portion of a reactant gas manifold has a vane which, when aligned with the division between inlet and outlet, allows reactant gas to pass into the manifold and out from the manifold, but when positioned normal to the manifold divider, blocks the inflow and outflow and seals off the manifold, thereby to contain whatever gas is in the flow fields during shutdown. This embodiment may be in the form of a box valve, or may comprise an entire manifold divider, extending the whole length of the manifold inlet.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 6 is a perspective view of a fuel cell power plant having a box damper valve disposed externally of the inlet/outlet manifold divider with the vane in the flow position.

FIG. 7 is a partial perspective view of the apparatus of FIG. 6 showing the vane in the containment position.

FIG. 8 is a partial perspective view of the apparatus of FIG. 1 with passive vane control.

MODE(S) FOR CARRYING OUT THE INVENTION

Figure 1:
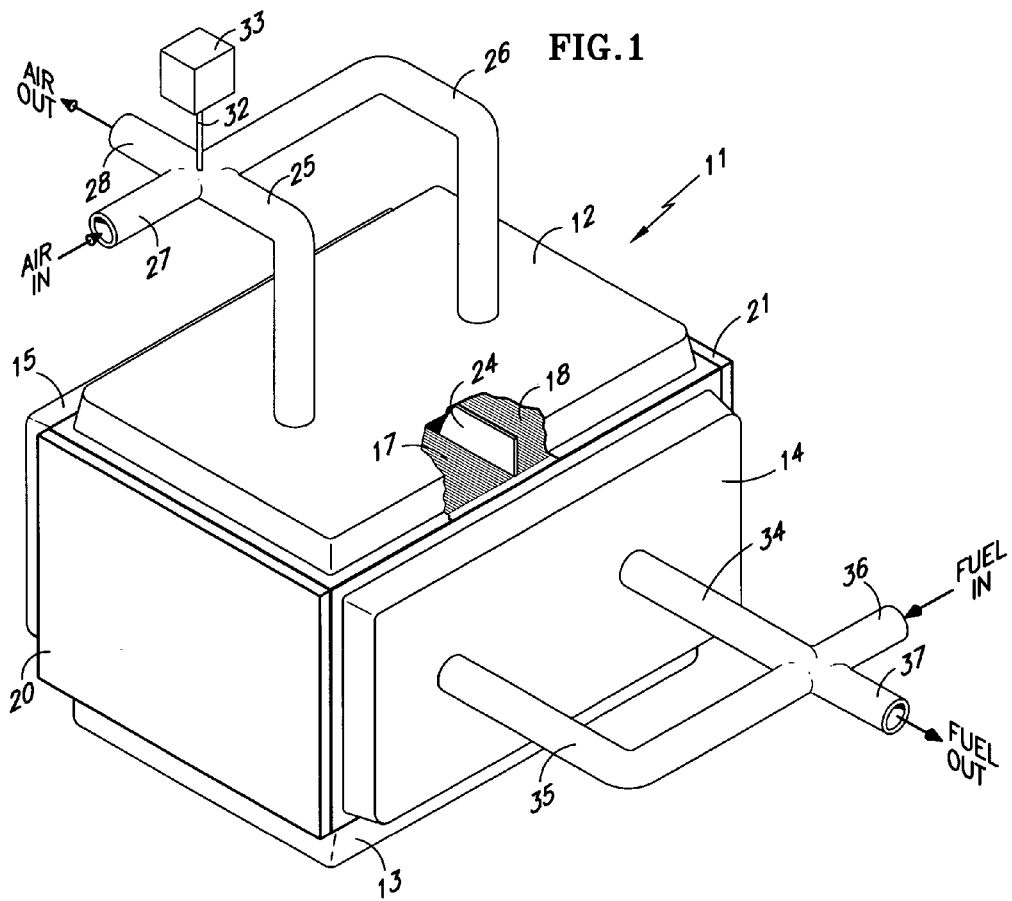
FIG. 1 is a perspective view of an embodiment of the invention utilizing cross conduits to form a single valve that selectively permits flow or containment of gases in the reactant flow fields.

Referring to FIG. 1, a fuel cell stack 11 has an air (or other oxidant) inlet/outlet manifold 12, an air turn manifold 13, a fuel inlet/outlet manifold 14, and a fuel turn manifold 15. The fuel cells 17, 18 of the stack are pressed together in electrically conductive relationship by means of pressure plates 20, 21. The pressure plate rods, and straps that may hold the manifolds, along with other auxiliary apparatus, are not shown. The air inlet/outlet manifold 12 has a divider 24 that causes inlet air from an inlet conduit 25 to proceed through the left half of the fuel cells 17 as shown in FIG. 1, then traverse the air turn manifold 13 and proceed through the right half of the fuel cells 18 where it is directed to an outlet conduit 26.

Figures 2, 3:
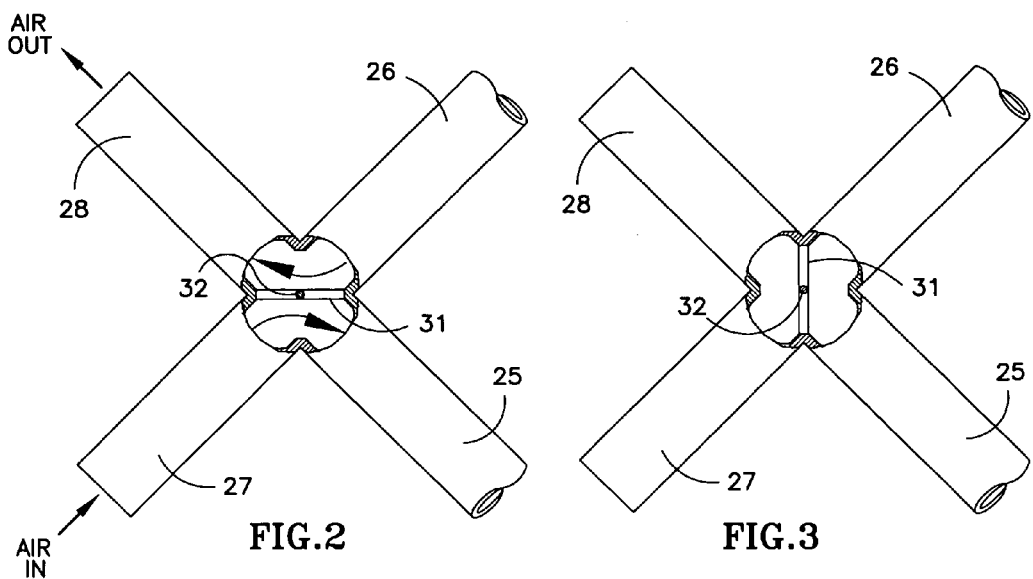
FIG. 2 is a partial top plan view, partially broken away, showing the valve in a flow position.
FIG. 3 is a partial top plan view, partially broken away, showing the valve in a containment position.

The conduits 25 and 26 are connected to additional conduits 27, 28 in an orthogonal fashion so that with a vane 31 oriented from right to left as illustrated in FIG. 2, air can flow from the air-in conduit 27 past the vane 31 through the inlet conduit 25 and into the manifold 12; and air can flow from the manifold 12 through the outlet conduit 26 past the vane 31 and through the air-out conduit 28 to exhaust. As used herein, the term exhaust, particularly with respect to fuel reactant gas, includes venting to ambient as well as conduction through a recycle loop.

With the vane 31 turned by a shaft 32 to be from top to bottom as shown in FIG. 3, the air-in conduit 27 is connected to the air-out conduit 28, and the inlet conduit 25 is connected to the outlet conduit 26. In other words, the two chambers of the air inlet/outlet manifold 12 are connected to each other, which effectively contains any gas in the air flow fields of the fuel cell stack.

The single valve comprised of the orthogonal conduits 25–28 and the vane 31 thus allows flow into and out of the air flow fields when in one position, and blocks flow to or from the air flow fields when in a second position.

As seen in FIG. 1, a similar arrangement may be utilized for fuel inlet, outlet and containment as illustrated by the orthogonally disposed conduits 34–37 which bear the same relationship to each other as do the conduits 25–28 on the air side.

Figure 4:
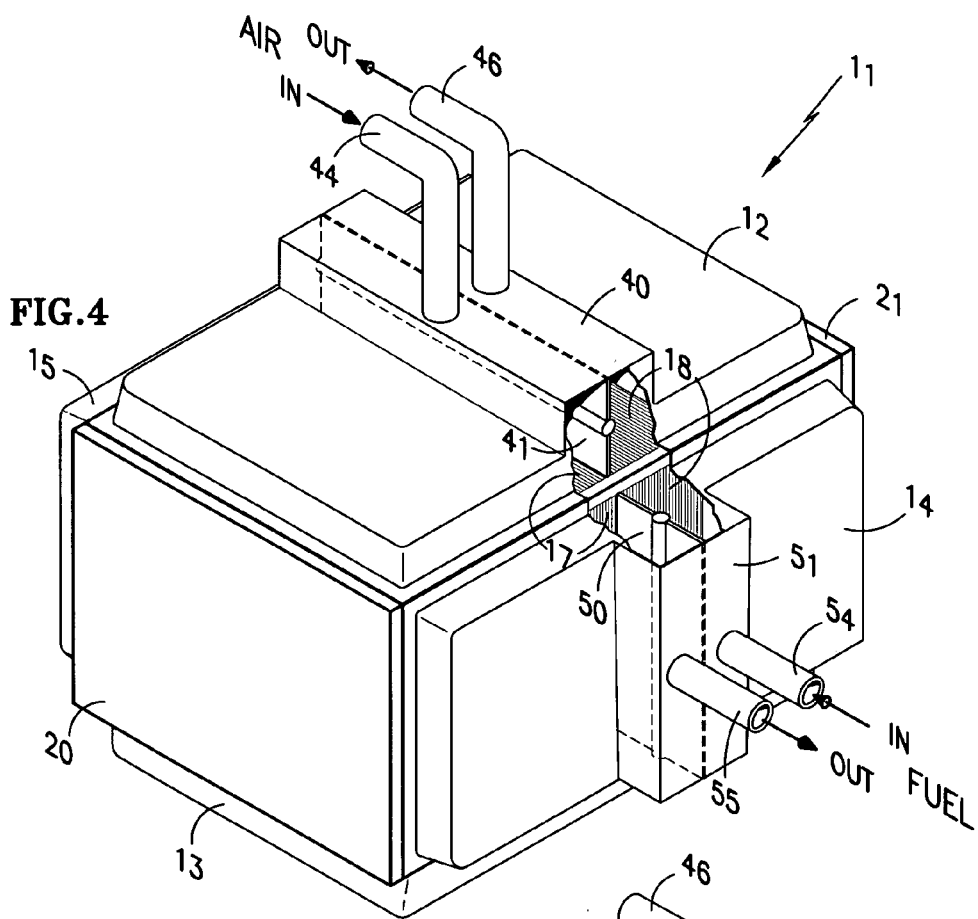
FIG. 4 is a perspective view of a fuel cell power plant with a reactant gas inlet manifold divider consisting of a vane shown in a flow position.
Figure 5:
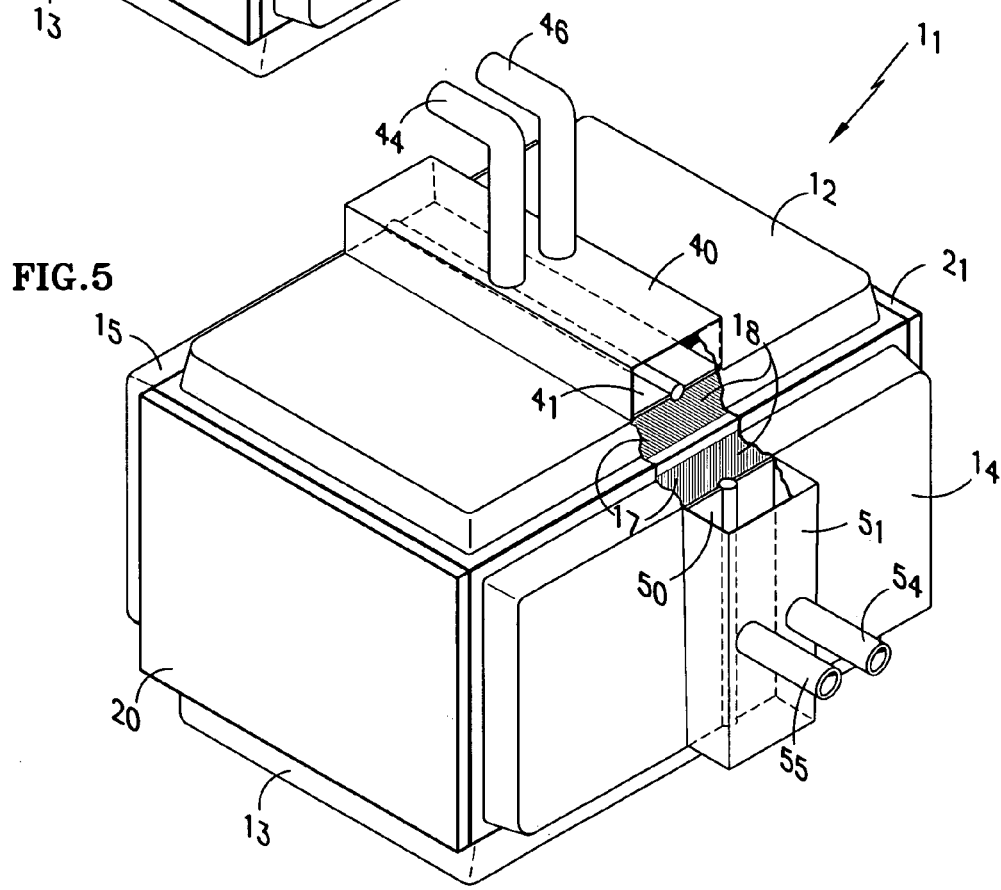
FIG. 5 is a perspective view of a fuel cell power plant with a reactant gas inlet manifold divider consisting of a vane shown in a containment position.

In FIG. 4, a chamber 40 extends the entire width of the air inlet/outlet manifold 12. A vane 41, when in a vertical position as shown in FIG. 4, divides the flow in the same fashion as the divider 24 so that air flowing in an air-in conduit 44 will flow into the fuel cells (17) at the left side of the stack 11, and air flowing out of the fuel cells (18) on the right side of the stack will flow into an air-out conduit 46. When the vane 41 is turned into a horizontal position as shown in FIG. 5, it blocks the structure 40 completely, thus isolating the fuel cells (17, 18) from the conduits 44, 46.

A similar vane 50 within a structure 51 can allow flow of fuel into the fuel cells (18) on the right side of the stack when the vane is aligned with fuel inlet and outlet conduits 54, 55, as shown in FIG. 4, the innermost portion of the vane 50 serving as the divider within the fuel inlet manifold 14. On the other hand, when the vane 50 is rotated so as to extend across the structure 51, it isolates the fuel cells (17, 18) from the conduits 54, 55 thus providing for containment of gas within the fuel flow fields of the stack 11.

A similar embodiment is illustrated in FIGS. 6 and 7. Therein, the air inlet manifold 12 includes a divider 24 as in FIG. 1. A structure 58 exists externally of the air inlet/outlet manifold 12 and includes a vane 59 that will align with the divider 24 when it is vertical as shown in FIG. 6, thereby allowing the flow of air in and out of the fuel cells through the conduits 44, 46. When the vane 59 is rotated into a horizontal position as seen in FIG. 7, it completely blocks the structure 58, thus isolating the fuel cells (17, 18) from the conduits 44, 46. A similar vane and structure at the fuel manifold can contain or permit flow of fuel gas in a similar fashion.

The transfer of the vanes from either position to the other may be achieved by any conventional means 33 (FIG. 1) known to the art. The vane movement may be passive, the flow of gas in the conduits 26 and 27 forcing the vane to turn against the force of a spring 60, as shown in FIG. 8. An active, electrically powered device, such as solenoid linkages, stepper motors, or otherwise, may be used.

Although this invention has been described for a fuel cell containing two pass oxidant and fuel flow configurations, the embodiment (FIG. 1) with vanes in crosses is applicable to other known flow configurations.

The aforementioned patent application is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A single valve for selectively providing either (a) flow of gas into and out of or (b) containment of gas within reactant gas flow fields of a fuel cell stack, said valve comprising:
    a gas inlet path;
    a gas outlet path;
    a vane, disposed between said gas inlet path and said gas outlet path, which may be oriented in a first position or a second position, said second position being normal to said first position, said vane, when in said first position allowing flow of reactant gas from a source through said inlet path to the fuel cell stack and from the fuel cell stack through said outlet path to exhaust, and when in said second position blocking flow into and out of said fuel cell stack through said paths.

2. A valve according to claim 1, comprising:
    four conduits interconnected at four apexes of a substantially orthogonal intersection;
    said vane being within said intersection and capable of being disposed in said first position between a first pair of said apexes to interconnect a first one of said conduits with a second one of said conduits thereby forming said gas inlet path, and to interconnect a third one of said conduits with a fourth one of said conduits thereby forming said gas outlet path, said vane being capable of being disposed in said second position, normal to said first position, between a second pair of said apexes to interconnect said first one of said conduits with said fourth one of said conduits and to interconnect said second one of said conduits with said third one of said conduits, thereby blocking said flow into and out of said fuel cell stack through said paths.

3. A valve according to claim 1, comprising:
    a gas inlet/outlet manifold having a gas flow path; and wherein:
    said vane is disposed in said gas flow path, operable when in said first position to divide said gas flow path into said gas inlet path and said gas outlet path, and operable when in said second position to block said gas flow path.

4. A valve according to claim 1, comprising:
    a gas inlet/outlet manifold having a divider to separate said inlet path from said outlet path so as to direct incoming gas into a first half of said fuel cell stack and to receive outgoing gas from a second half of said fuel cell stack; and wherein:
    said vane is disposed in alignment with said divider when in said first position and is normal to said divider, thereby blocking said inlet path and said outlet path, when in said second position.

5. A valve according to claim 1 wherein:
    said vane is transferred from one position to another by an active, electrically powered device.

6. A valve according to claim 1 wherein:
    said vane is caused by a spring to assume said second position and is moved into said first position by gas flowing in said inlet path and said outlet path.

* * * * *